United States Patent
Martin et al.

(10) Patent No.: US 10,150,418 B2
(45) Date of Patent: Dec. 11, 2018

(54) INTEGRATED STEP ASSEMBLY FOR PICKUP TRUCK BOX

(71) Applicant: GM GLOBAL TECHNOLOGY OPERATIONS LLC, Detroit, MI (US)

(72) Inventors: Justin C. Martin, Ferndale, MI (US); David K. Rock, Washington, MI (US); Michael T. Chaney, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 94 days.

(21) Appl. No.: 15/357,380

(22) Filed: Nov. 21, 2016

(65) Prior Publication Data
US 2017/0313256 A1   Nov. 2, 2017

Related U.S. Application Data

(60) Provisional application No. 62/330,397, filed on May 2, 2016.

(51) Int. Cl.
| | |
|---|---|
| *B60R 3/00* | (2006.01) |
| *B62D 21/03* | (2006.01) |
| *B62D 21/09* | (2006.01) |
| *B62D 33/023* | (2006.01) |

(52) U.S. Cl.
CPC .............. *B60R 3/007* (2013.01); *B62D 21/03* (2013.01); *B62D 21/09* (2013.01); *B62D 33/023* (2013.01)

(58) Field of Classification Search
CPC ...... B60R 3/007; B62D 33/023; B62D 21/03; B62D 21/09

USPC .......................... 296/204, 30, 184.1, 37.6, 43
See application file for complete search history.

(56) References Cited

U.S. PATENT DOCUMENTS

| | | | | |
|---|---|---|---|---|
| 4,017,093 | A * | 4/1977 | Stecker, Sr. ............... | B60R 3/00 280/163 |
| 5,615,922 | A * | 4/1997 | Blanchard ................. | B60R 9/02 224/404 |
| 7,118,150 | B2 * | 10/2006 | Bruford ..................... | B60R 3/02 296/37.1 |
| 9,126,535 | B1 * | 9/2015 | Moore ....................... | B60R 3/00 |
| 2005/0134070 | A1 * | 6/2005 | Plentis ...................... | B60R 9/02 296/37.1 |
| 2007/0145754 | A1 * | 6/2007 | Tier ........................... | B60R 3/00 293/109 |
| 2008/0231076 | A1 * | 9/2008 | Plavetich .................. | B60R 3/02 296/183.1 |

\* cited by examiner

*Primary Examiner* — Jason S Morrow
*Assistant Examiner* — E Turner Hicks
(74) *Attorney, Agent, or Firm* — Cantor Colburn LLP

(57) ABSTRACT

A cargo box for a vehicle includes a base member having a first edge portion, a second edge portion, a first side edge portion and an opposing second side edge portion. A first cross sill extends across the base member. A second cross sill extends across the base member. A side panel member is coupled to the base member along one of the first and second side edge portions. The side panel member includes an opening. A step assembly includes a first step support coupled to the first cross sill, a second step support coupled to the second cross sill and at least one step member coupled to and extending between the first step support and second step support. The step member is arranged at the opening in the side panel member. The step member is decoupled from the side panel member.

20 Claims, 8 Drawing Sheets

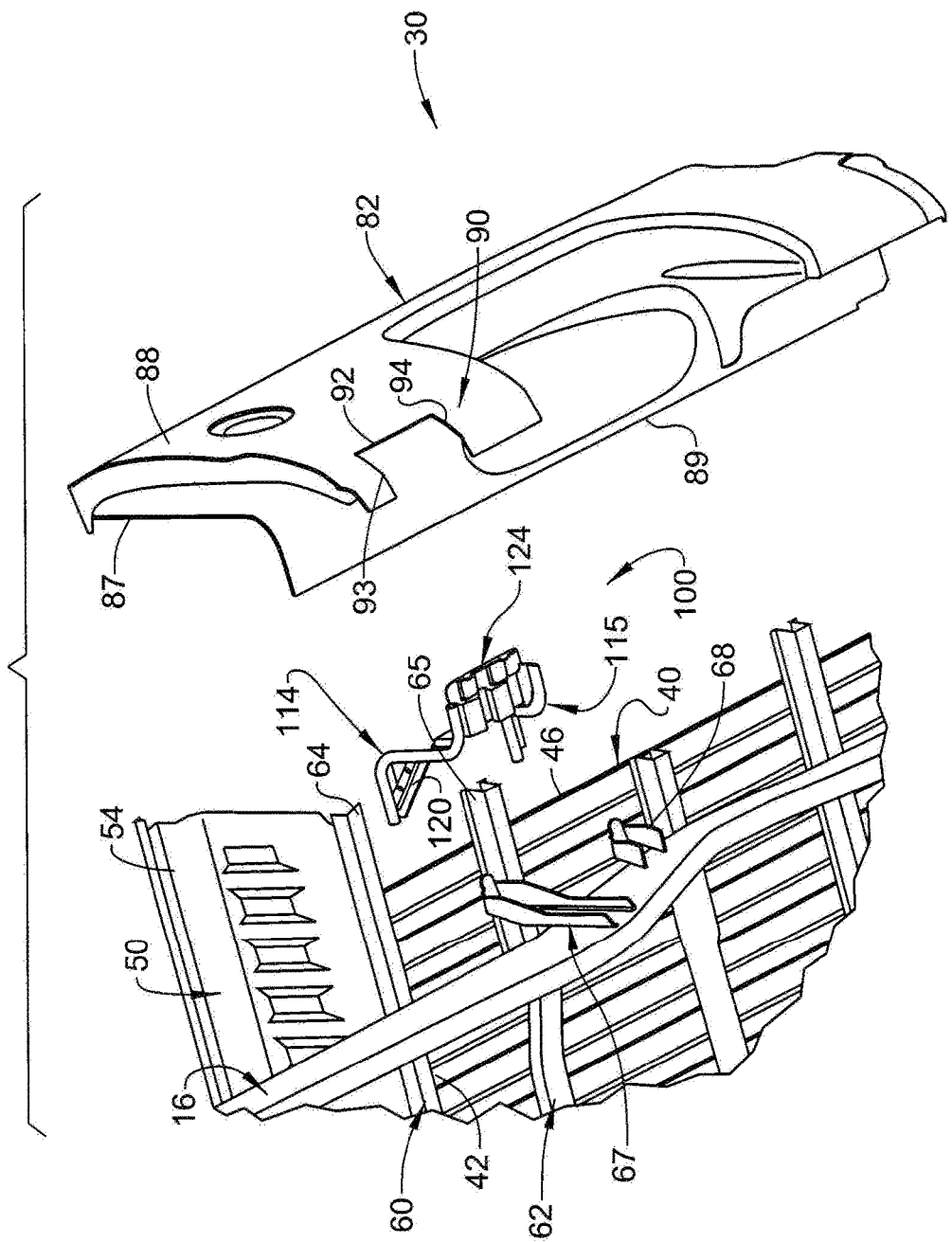

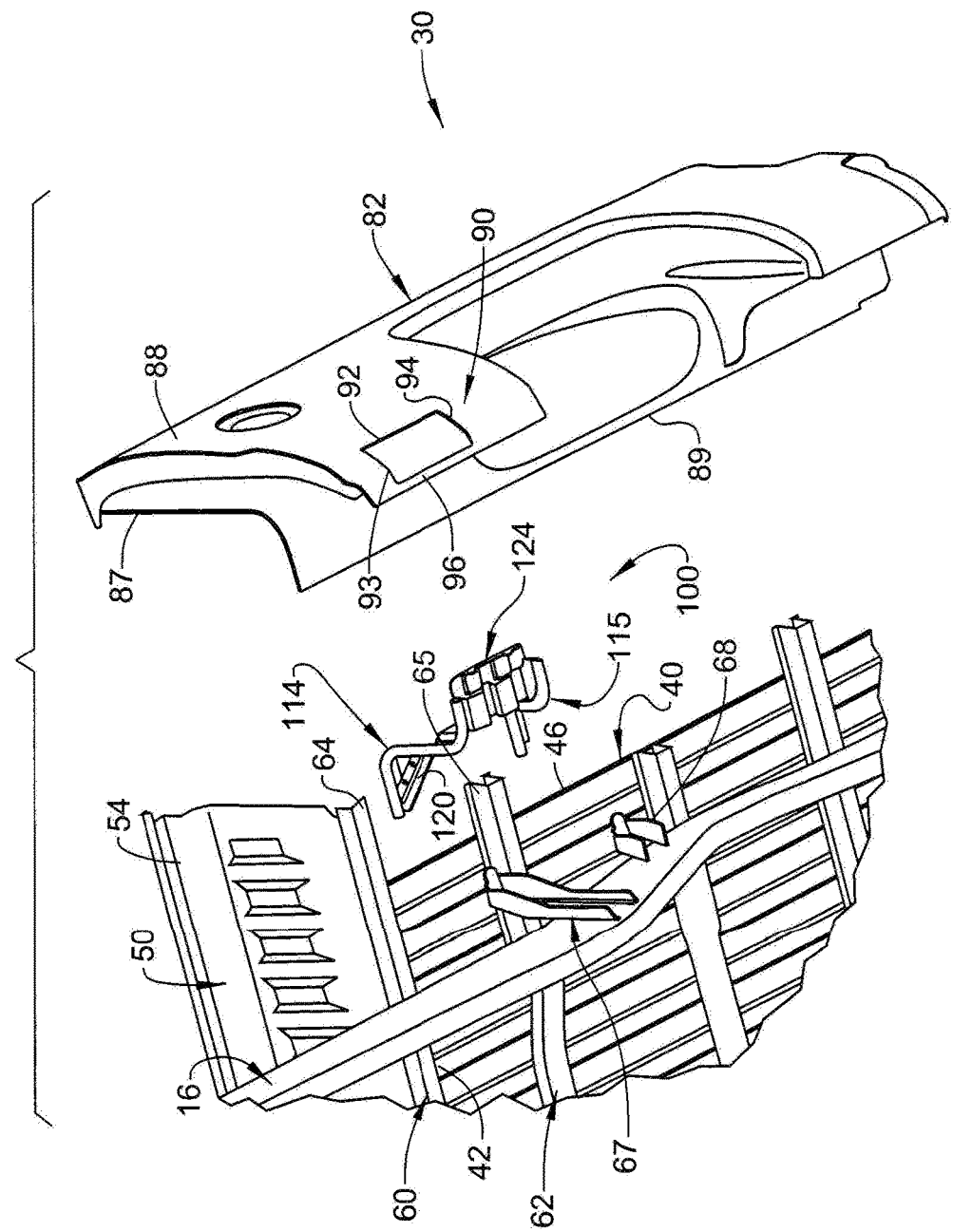

INTEGRATED STEP ASSEMBLY FOR PICKUP TRUCK BOX

CROSS-REFERENCE TO RELATED APPLICATIONS

The present application claims priority to U.S. Provisional Application No. 62/330,397, filed on May 2, 2016, the contents of which are incorporated by reference herein in their entirely.

FIELD OF THE INVENTION

The subject disclosure relates to the art of vehicles and, more particularly, to an integrated step assembly for a pickup truck box.

BACKGROUND

Vehicles, such as pickup trucks, may include a cargo box that is utilized to transport various goods, tools, materials, and the like. Access to a front portion of the box can be difficult. To provide access to a front box zone, many users or dealers install assist steps that may take the form of a wheel-to-wheel running board or fold down, frame mounted steps. Options such as running boards and fold down steps are not available on all models, and are typically low to the ground thereby providing only limited access to the cargo box.

Other solutions to providing access include integrating steps or step side trucks. More specifically, steps were integrated into outer body panels of the cargo box. Integrated steps were typically tied into or partially supported by braces extending from box cross sills. Step side trucks require a specific shape and material for the cargo box that was not desired by all consumers. Further, step side trucks provide only limited access to front portions of the cargo box. Accordingly, it is desirable to provide a step that does not impact body styles and yet is positioned to provide expanded access to front portions of a cargo box.

SUMMARY OF THE INVENTION

In accordance with an exemplary aspect, a cargo box for a vehicle includes a base member having a first edge portion, a second edge portion, a first side edge portion and an opposing second side edge portion. A first cross sill extends across the base member between the first side edge portion and the second side edge portion. A second cross sill extends across the base member between the first side edge portion and the second side edge portion. The second cross sill is spaced from the first cross sill. A side panel member is coupled to the base member along one of the first and second side edge portions. The side panel member includes an opening. A step assembly includes a first step support coupled to the first cross sill, a second step support coupled to the second cross sill and at least one step member coupled to and extending between the first step support and second step support. The step member is arranged at the opening in the side panel member. The step member is decoupled from the side panel member.

In accordance with another aspect of an exemplary embodiment, a vehicle includes a chassis defining a frame for the vehicle, a passenger cab is coupled to the chassis, first and second front wheels are by the chassis, first and second rear wheels are supported by the chassis, and a cargo box is supported by the chassis aft of the passenger cab. The cargo box includes a base member having a first edge portion, a second edge portion, a first side edge portion and an opposing second side edge portion. A first cross sill extends across the base member between the first side edge portion and the second side edge portion. A second cross sill extends across the base member between the first side edge portion and the second side edge portion. The second cross sill is spaced from the first cross sill. A side panel member is coupled to the base member along one of the first and second side edge portions. The side panel member includes an opening. A step assembly includes a first step support coupled to the first cross sill, a second step support coupled to the second cross sill and at least one step member coupled to and extending between the first step support and second step support. The step member is arranged at the opening in the side panel member. The step member is decoupled from the side panel member.

The above features and advantages and other features and advantages of the disclosure are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 2A depicts a partially disassembled view of the cargo box of FIG. 1;

FIG. 2B depicts a partially disassembled view of a cargo box, in accordance with another aspect of an exemplary embodiment;

DESCRIPTION OF THE EMBODIMENTS

Figure 1:
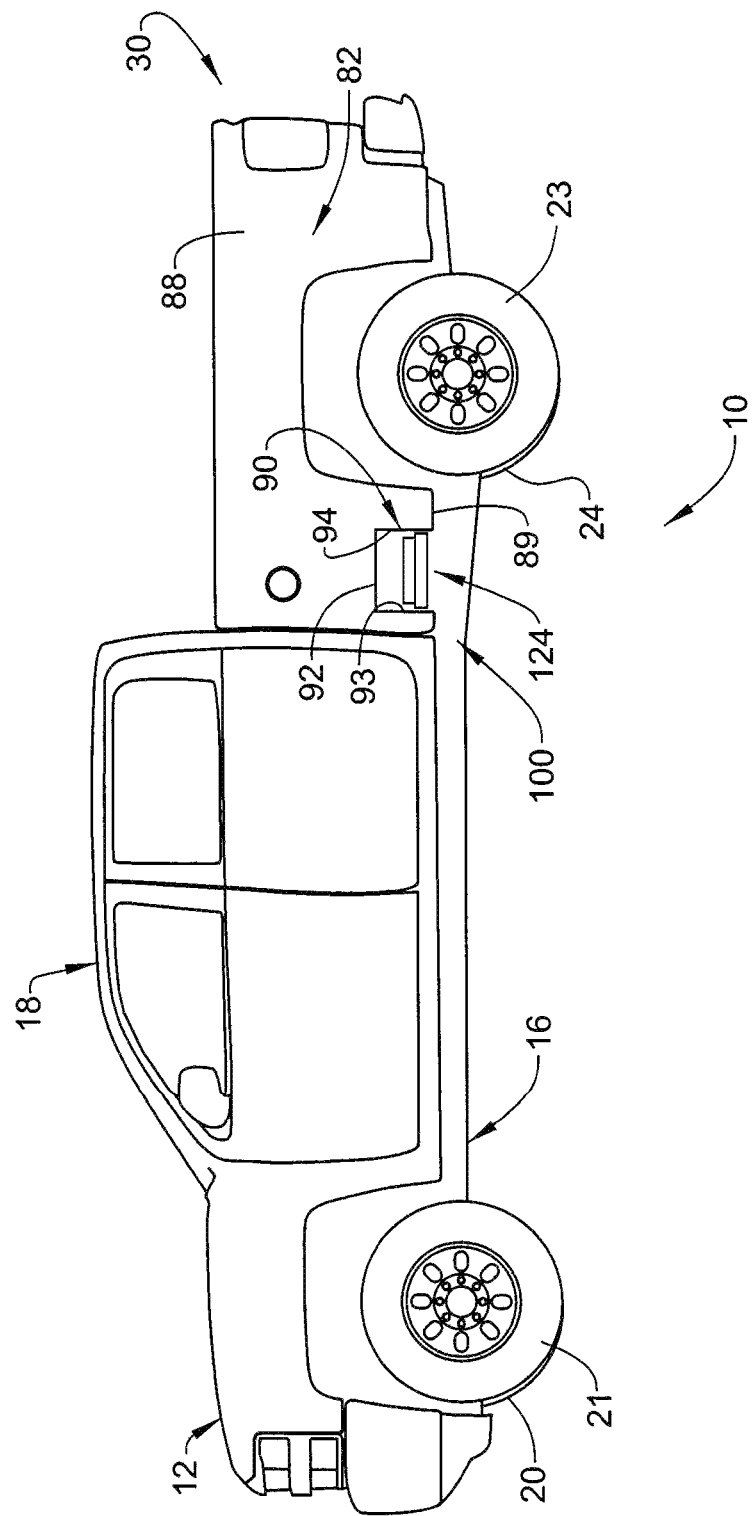
FIG. 1 depicts a vehicle, shown as a pickup truck, including a cargo box, having an integrated step assembly, in accordance with an exemplary embodiment.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is indicated generally at 10 in FIG. 1. Vehicle 10 is shown in the form of a pickup truck 12. Pickup truck 12 includes a chassis 16 having a passenger cab 18. Chassis 16 may support first and second front wheels 20 and 21 as well as first and second rear wheels 23 and 24. Pickup truck 12 is also shown to include a cargo box 30.

Figure 3:
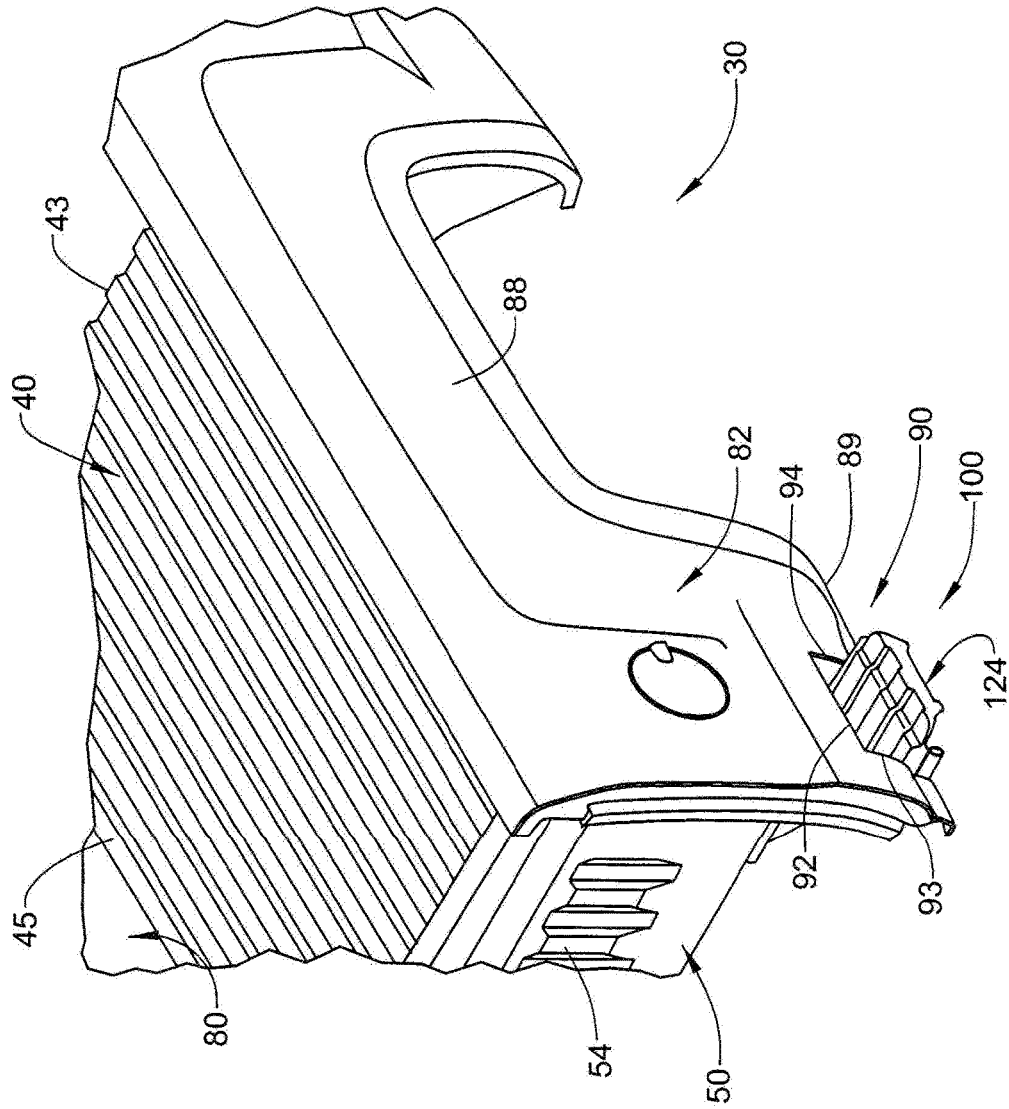
FIG. 3 depicts a side view of the cargo box of FIG. 1.

Referring to FIGS. 2A, and 3, and with continuing reference to FIG. 1, in accordance with an exemplary embodiment, cargo box 30 may include a base member 40 having a first edge portion 42, a second edge portion 43, a first side edge portion 45 and a second side edge portion 46 as shown in FIGS. 2A and 3. In the exemplary aspect shown, second side edge portion 46 is arranged opposite first side edge portion 45 with first edge portion 42 defining a front or forward end (not separately labeled) of cargo box 30. A wall member 50 is coupled to first edge portion 42. Wall member 50 extends substantially perpendicularly from base member 40 and defines a front or forward wall 54 of cargo box 30.

In further accordance with an exemplary aspect illustrated in FIG. 2A, cargo box 30 includes a first cross sill 60 and a second cross sill 62. First and second cross sills 60 and 62 extend across base member 40 between first and second side edge portions 45 and 46. First cross sill 60 is arranged proximate to first edge portion 42. At this point, it should be understood that the number and relative location of cross sills may vary. First cross sill 60 includes a first end portion 64 and an opposing second end portion (not shown). Similarly, second cross sill 62 includes a first end portion 65 and an opposing second end portion (also not shown). First cross sill 60 is secured to chassis 16 through a first frame mount 67 and second cross sill 62 is secured to chassis 16 through a second frame mount 68. First frame mount 67 couples first end portion 64 of first cross sill 60 to chassis 16 while second frame mount 68 couples first end portion 65 of second cross sill 62 to chassis 16. Additional frame mounts (not shown) may be employed to connect the respective second end portions of first and second cross sills 60 and 62 to chassis 16.

In further accordance with an exemplary embodiment, cargo box 30 includes a first side panel member 80 and a second side panel member 82. Reference will now be made to FIG. 2A in describing second side panel member 82 with an understanding that first side panel member 80 may be substantially similarly formed. Second side panel member 82 includes an inner panel member 87 that defines an interior surface (not separately labeled) of cargo box 30 and an outer panel member 88. Outer panel member 88 includes an upper edge portion (not separately labeled) and a lower or bottom edge portion 89.

In still further accordance with an exemplary embodiment, second side panel member 82 includes an opening 90 formed in outer panel member 88. At this point, it should be understood that opening 90 may also extend through inner panel member 87. Also, it should be understood that a corresponding opening (not shown) may be provided in first side panel member 80. Opening 90 includes an upper edge portion 92, a first side edge portion 93 and a second side edge portion 94. In the exemplary embodiment shown, opening 90 is devoid of a bottom edge portion. It should however be understood that a bottom edge portion such as indicated at 96 in FIG. 2B could be provided depending upon body type, options and the like for vehicle 10.

Figure 4:
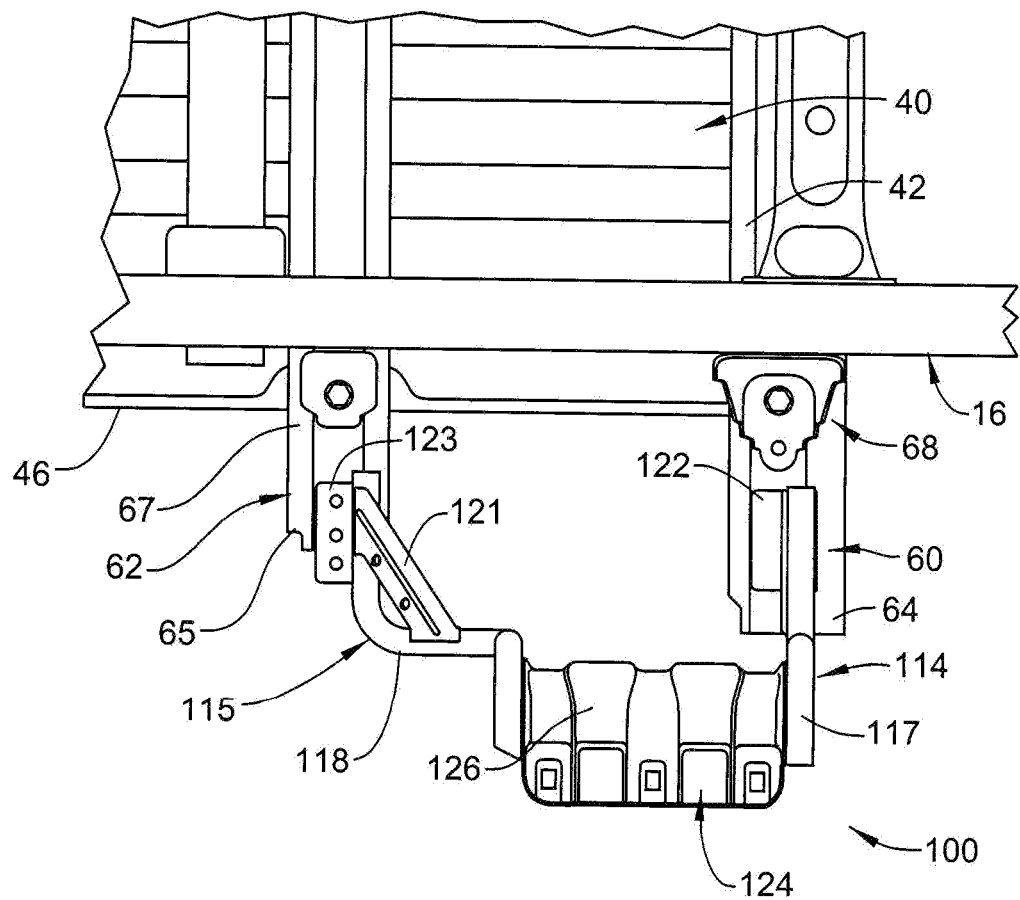
FIG. 4 depicts a plan view of the integrated step assembly, in accordance with an aspect of an exemplary embodiment.
Figure 5:
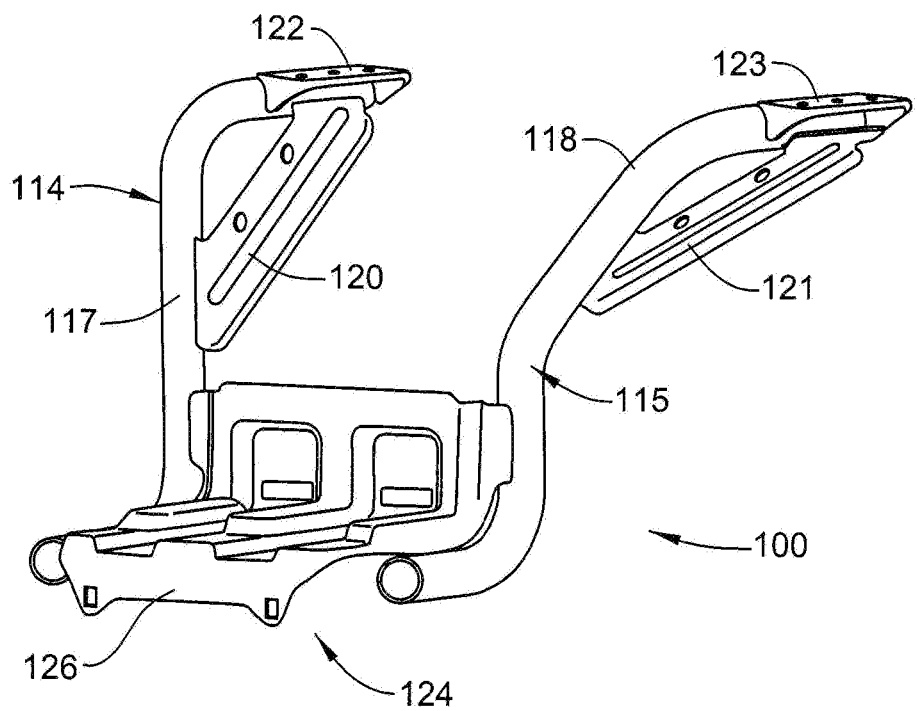
FIG. 5 depicts the step assembly of FIG. 4 in accordance with an aspect of an exemplary embodiment.

In still yet further accordance with an exemplary aspect, cargo box 30 includes an integrated step assembly 100 coupled to first and second cross sills 60 and 62. Step assembly 100 includes a first step support 114 coupled to first cross sill 60 and a second step support 115 coupled to second cross sill 62. As illustrated in FIGS. 4 and 5, first step support 114 may take the form of a first tubular steel member 117 and second step support 115 may take the form of a second tubular steel member 118. First step support 114 may include a first brace 120 to provide any necessary additional structural rigidity. Second step support 115 may include a second brace 121 to provide any necessary additional structural rigidity. First and second step supports 114 and 115 may include corresponding mounting brackets 122 and 123 that provide an interface with respective ones of first and second cross sills 60 and 62. A step member 124 extends between and is connected with first and second step supports 114 and 115. Step member 124 may be formed from stamped steel 126.

In accordance with an aspect of an exemplary embodiment, step member 124 registers or aligns with, and is exposed and accessible through opening 90 in second side panel member 82. In this manner, a user may employ step member 124 to gain access to forward portions (not separately labeled) of cargo box 30. Further, step member 124 may be readily integrated into a wide array of cargo box types without the need to provide additional contours, recesses, reliefs or otherwise substantially alter a shape of outer panel member 88. Additionally, it should be appreciated that step member 124 is decoupled from second side panel member 82. Decoupling step member 124 from second side panel member 82 eliminates unintended deformations and/or the need for additional reinforcement of outer panel member 88. It should be understood that opening 90 and step member may be provided with various forms of trim elements that obscure gaps between components and provide a more finished appearance. It should be further understood that trim elements about opening 90 may be decoupled from trim elements associated with step member 124 in order to preserve independent movement cause by flexing which may result from normal operation. Further, it should be appreciated that a step assembly may be provided on one or both sides of cargo box 30.

Figure 6:
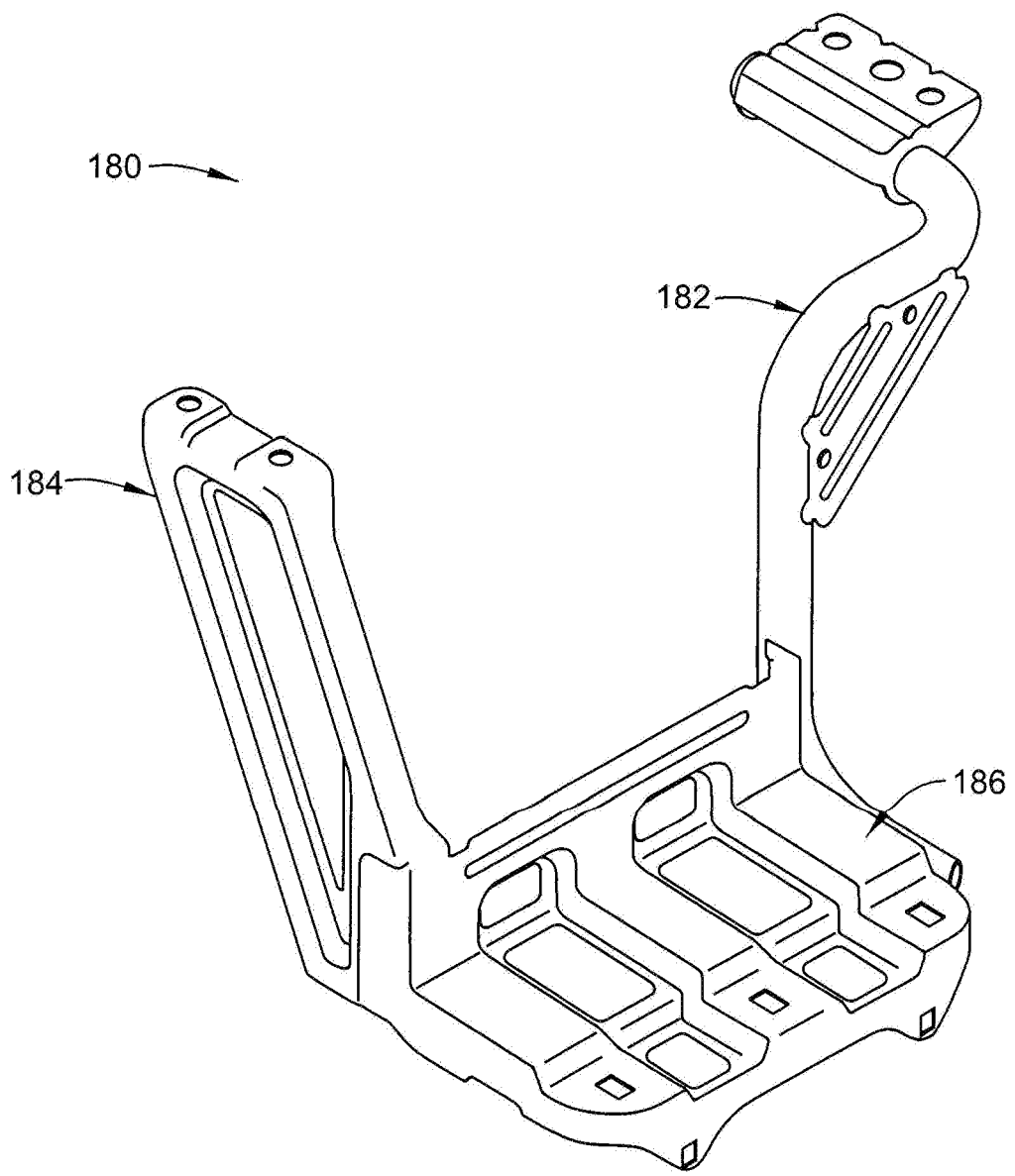
FIG. 6 depicts an integrated step assembly in accordance with another aspect of an exemplary embodiment.
Figure 7:
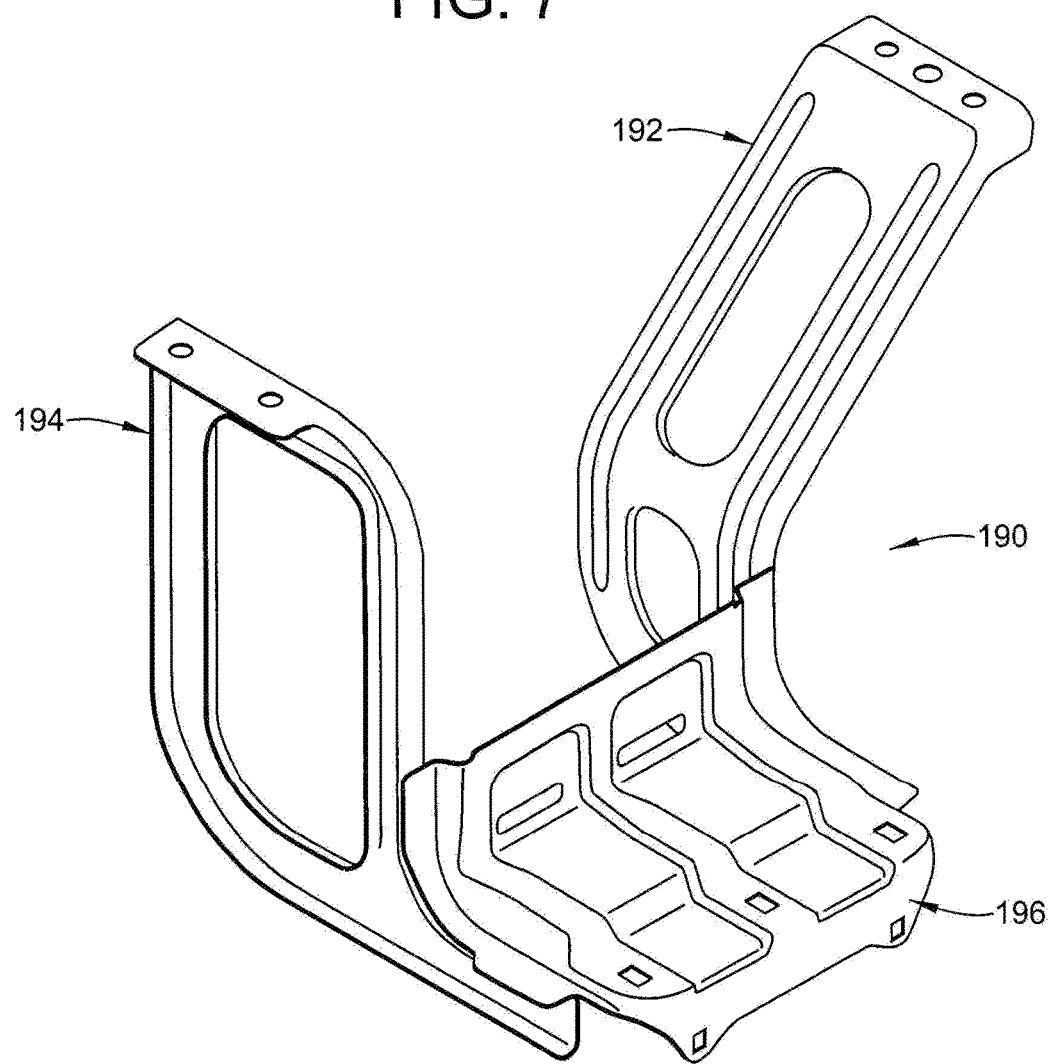
FIG. 7 depicts an integrated step assembly in accordance with yet another aspect of an exemplary embodiment.

Referring to FIG. 6, it should be understood that a step assembly 180 in accordance with an exemplary aspect may include a step support 182 formed from tubular steel and a second step support 184 formed from stamped steel supporting an integrated step member 186. Alternatively, as illustrated in FIG. 7, a step assembly 190 may include first and second step supports 192 and 194 formed from stamped steel supporting a step member 196.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A cargo box for a vehicle comprising:
    a base member including a first edge portion, a second edge portion, a first side edge portion and an opposing second side edge portion;
    a first cross sill extending across the base member between the first side edge portion and the second side edge portion;
    a second cross sill extending across the base member between the first side edge portion and the second side edge portion, the second cross sill being spaced from the first cross sill;
    a side panel member coupled to the base member along one of the first and second side edge portions, the side panel member including an opening; and
    a step assembly including a first step support coupled to the first cross sill, a second step support coupled to the second cross sill and at least one step member coupled to and extending between the first step support and second step support, the step member being arranged at the opening in the side panel member, wherein the step member extends through and is decoupled from the side panel member.

2. The cargo box according to claim 1, wherein the side panel member includes a bottom edge portion, the step member being arranged inwardly of the bottom edge portion.

3. The cargo box according to claim 1, wherein the first cross sill is arranged substantially at the first edge portion of the base member.

4. The cargo box according to claim 3, wherein the first edge portion defines a forward edge portion of the cargo box.

5. The cargo box according to claim 1, wherein the opening is formed in an exterior surface of the side panel member and includes an upper edge portion, a first side edge portion and a second side edge portion.

6. The cargo box according to claim 5, wherein the opening is devoid of a bottom edge portion.

7. The cargo box according to claim 1, wherein at least one of the first step support and second step support is formed from tubular steel.

8. The cargo box according to claim 1, wherein at least one of the first step support and second step support is formed from stamped steel.

9. The cargo box according to claim 1, wherein the step member is formed from stamped steel.

10. A vehicle comprising:
a chassis defining a frame for the vehicle;
a passenger cab coupled to the chassis;
first and second front wheels supported by the chassis;
first and second rear wheels supported by the chassis; and
a cargo box supported by the chassis aft of the passenger cab, the cargo box comprising:
  a base member including a first edge portion, a second edge portion, a first side edge portion and an opposing second side edge portion;
  a first cross sill extending across the base member between the first side edge portion and the second side edge portion;
  a second cross sill extending across the base member between the first side edge portion and the second side edge portion, the second cross sill being spaced from the first cross sill;
  a side panel member coupled to the base member along one of the first and second side edge portions, the side panel member including an opening; and
  a step assembly including a first step support coupled to the first cross sill, a second step support coupled to the second cross sill and at least one step member coupled to and extending between the first step support and second step support, the step member being arranged at the opening in the side panel member, wherein the step member extends through and is decoupled from the side panel member.

11. The vehicle according to claim 10, wherein the side panel member includes a bottom edge portion, the step member being arranged inwardly of the bottom edge portion.

12. The vehicle according to claim 10, wherein the first cross sill is arranged substantially at the first edge portion of the base member.

13. The vehicle according to claim 12, wherein the first edge portion defines a forward edge portion of the cargo box.

14. The vehicle according to claim 10, wherein the opening is formed in an exterior surface of the side panel member and includes an upper edge portion, a first side edge portion and a second side edge portion.

15. The vehicle according to claim 14, wherein the opening is devoid of a bottom edge portion.

16. The vehicle according to claim 10, wherein at least one of the first step support and second step support is formed from tubular steel.

17. The vehicle according to claim 10, wherein at least one of the first step support and second step support is formed from stamped steel.

18. The vehicle according to claim 10, wherein the step member is formed from stamped steel.

19. The vehicle according to claim 10, further comprising: a plurality of frame mounts mechanically linking the cargo box to the chassis.

20. The vehicle according to claim 10, wherein the opening is forward of the first and second rear wheels.

* * * * *